US007970745B2

(12) United States Patent
Norcott

(10) Patent No.: US 7,970,745 B2
(45) Date of Patent: Jun. 28, 2011

(54) SCHEMA VERSION MANAGEMENT FOR DATABASE MANAGEMENT

(75) Inventor: William D. Norcott, Hollis, NH (US)

(73) Assignee: Oracle International Corp, Redwood Shores, CA (US)

( * ) Notice: Subject to any disclaimer, the term of this patent is extended or adjusted under 35 U.S.C. 154(b) by 257 days.

(21) Appl. No.: 11/471,839

(22) Filed: Jun. 21, 2006

(65) Prior Publication Data

US 2007/0299858 A1 Dec. 27, 2007

(51) Int. Cl.
*G06F 17/00* (2006.01)

(52) U.S. Cl. .................. 707/694; 707/822; 707/803; 709/201; 715/720

(58) Field of Classification Search .................. 709/201; 707/694

See application file for complete search history.

(56) References Cited

U.S. PATENT DOCUMENTS

| 2003/0204843 A1* | 10/2003 | Barmettler et al. | 717/178 |
| 2004/0055005 A1* | 3/2004 | Creswell et al. | 719/315 |
| 2006/0294159 A1* | 12/2006 | Dettinger et al. | 707/203 |

* cited by examiner

*Primary Examiner* — Dong Wong
*Assistant Examiner* — Tuan-Khanh Phan

(57) ABSTRACT

Creating a relational database table that identifies at least one application as belonging to a logical group. All components that belong to the logical group are listed and a unique schema name is created for each component by combining a logical schema name of each component with a designated system name for the component. Each component co-exists in a single database instance.

16 Claims, 6 Drawing Sheets

SCHEMA VERSION REGISTRY

| MRC | MR TYPE | COMPONENT ID | VERSION | STATUS | SCHEMA |
|---|---|---|---|---|---|
| X | | PORTAL | X.1 | VALID | PORTAL |
| PRODUCTION | | PORTAL | X.2 | | PRODUCTION_PORTAL |
| TEST | | PORTAL | X.2 | VALID | TEST_PORTAL |
| TEST | | DISCOVERER | X.2 | | TEST_DISCOVERER |

FIG. 3

SCHEMA VERSION MANAGEMENT FOR DATABASE MANAGEMENT

BACKGROUND

1. Field

The disclosed embodiments generally relate to database management and in particular to application version management and out-of-place upgrades.

2. Brief Description of Related Developments

Generally applications cannot share the same database with multiple versions of the same application. Programs and documents will generally include identifiers or schemas that allow it to identify which version of an application or element to which it relates was used. Namespaces can generally be used for identifiers. Namespaces are bound to schemas, or hard-coded, in order to know exactly which version of each element was used. The underlying application will consult the schema locations defined in the namespace for the corresponding version. Thus, in order to make use of multiple versions of the same application, the use of separate database instances is required. However, there are times when it is desirable to be able to have more than one version of an application running on a single database application or such other system, such as for example evaluating an upgrade or other change to an existing application. It may not be desirable to immediately move from the existing application version, which is know to be working, to the upgraded version, until there is an opportunity to evaluate the upgrade against the working environment. For example, it may be desirable to evaluate how data, bound to an original version, will work with an upgraded version of the underlying application. While it may be possible to establish a separate "test" or evaluation system just for this purpose, there are certain costs associated with a separate system that may not be economical or desired.

Different versions of an application typically require the use of separate instances. For example, if the software of a database was upgraded from release 1 to release 2, the database tables need to be upgraded. After the upgrade, the database tables from release 1 will no longer exist, since they have been converted to release 2, and it is not possible for release 1 and release 2 to co-exist in the same database at the same time. Typically, the release or version requires the availability of the resources associated with the entire database and cannot be shared. It should be noted that although the examples will be drawn to a "database" system, the applications of the disclosed embodiments are not so limited in scope, and can pertain to any suitable computerized application, program or system.

For example, an installation of an Oracle Application Server™ would require a separate database instance per each instance of the application server. Not only does this consume a great deal of resources, it may also require several database licenses, as well as management of several difference databases. This may not be a time, resource or cost effective solution.

However, there are advantages for a single database instance to be able to store multiple versions of the same software. For example, a customer having one relational database management system ("RDBMS") might want to create two separate systems, a production system and a test system for example, in order to evaluate any changes or upgrades to the underlying or base application. The production system could be used to run the customer's business with the original or unmodified version of the application, while the test system could be used to evaluate a new version of the software or new development of applications that would not be intended to impact the production system.

One problem faced in the above example is that each application, the production system and the test system, will presume that it is the only occupant of the database and will reserve the use of the hard-coded schema names. For example, a PAYROLL application would reserve and use the schema name "PAYROLL". This will not allow a release 1 version of "PAYROLL" to co-exist with a release 2 (production system) version of "PAYROLL" and a release 2 (test system) version of "PAYROLL" in the same database, because schema names are hard-coded and unique within a database management system.

Another problem faced for customers who upgrade from release 1 to release 2 is creating a reliable way to record the progress of an upgrade in the database itself, and keep track of which application is at which version. For example, if there is a Payroll application, a Benefits application, an Inventory application, and an Accounts Payable application, all running on the same database, it would be important to know that the Payroll and Benefits applications are upgraded to release 1 and that the Inventory and Accounts Payable applications are upgraded to release 2. This knowledge is important because newer versions of software have new capabilities, and these require database schema changes from release 1 to release 2. There may also be interaction between each application that requires each application to know the software version of the other. For example, features of a release 1 version of Payroll may not work with or interact properly with a release 2 version of the Benefits application. It would thus be advantageous to have a central repository that keeps track of all installed components and their application (for example Production-system and Test-system) to coexist simultaneously in the same database management system. Current software does not permit this. For example, an in-place upgrade from version X to version Y of the underlying application is "destructive" in the sense that instances of the version X application will not be able to interact with instances of the version Y application.

Attempts of applications to keep track of their schema versions is carried out in an adhoc and individual manner. It would be advantageous to allow for a unified way to keep track of multiple application running on a database.

Also, application upgrades are generally a manual process and each application in the instance of the same system must be upgraded independently of each other. This tends to be a process that is laborious, error-prone, difficult to plan for and execute, and requires system "downtime". It would be advantageous to have a centralized repository of version information that will permit the creation of automated upgrade tools that are capable of upgrading many different applications at once.

Prior solutions store version information for the purpose of upgrade and installation. It would be advantageous to be able to run multiple versions or multiple instances of the same software at the same time, all within a single database instance.

SUMMARY

The disclosed embodiments are directed to a method and system to allow multiple versions and instances of a component to run on the same system concurrently. In one embodiment, the method creates a relational database table that identifies at least one application as belonging to a logical group. All components that belong to the logical group are listed and a unique schema name is created for each component by combining a logical schema name of each component with a designated system name for the component. Each component co-exists in a single database instance.

BRIEF DESCRIPTION OF THE DRAWINGS

The foregoing aspects and other features of the disclosed embodiments are explained in the following description, taken in connection with the accompanying drawings, wherein:

FIG. 3 is an example of a schema version registry established in accordance with aspects of the disclosed embodiments.

DETAILED DESCRIPTION OF THE PREFERRED EMBODIMENT(s)

Figure 1:
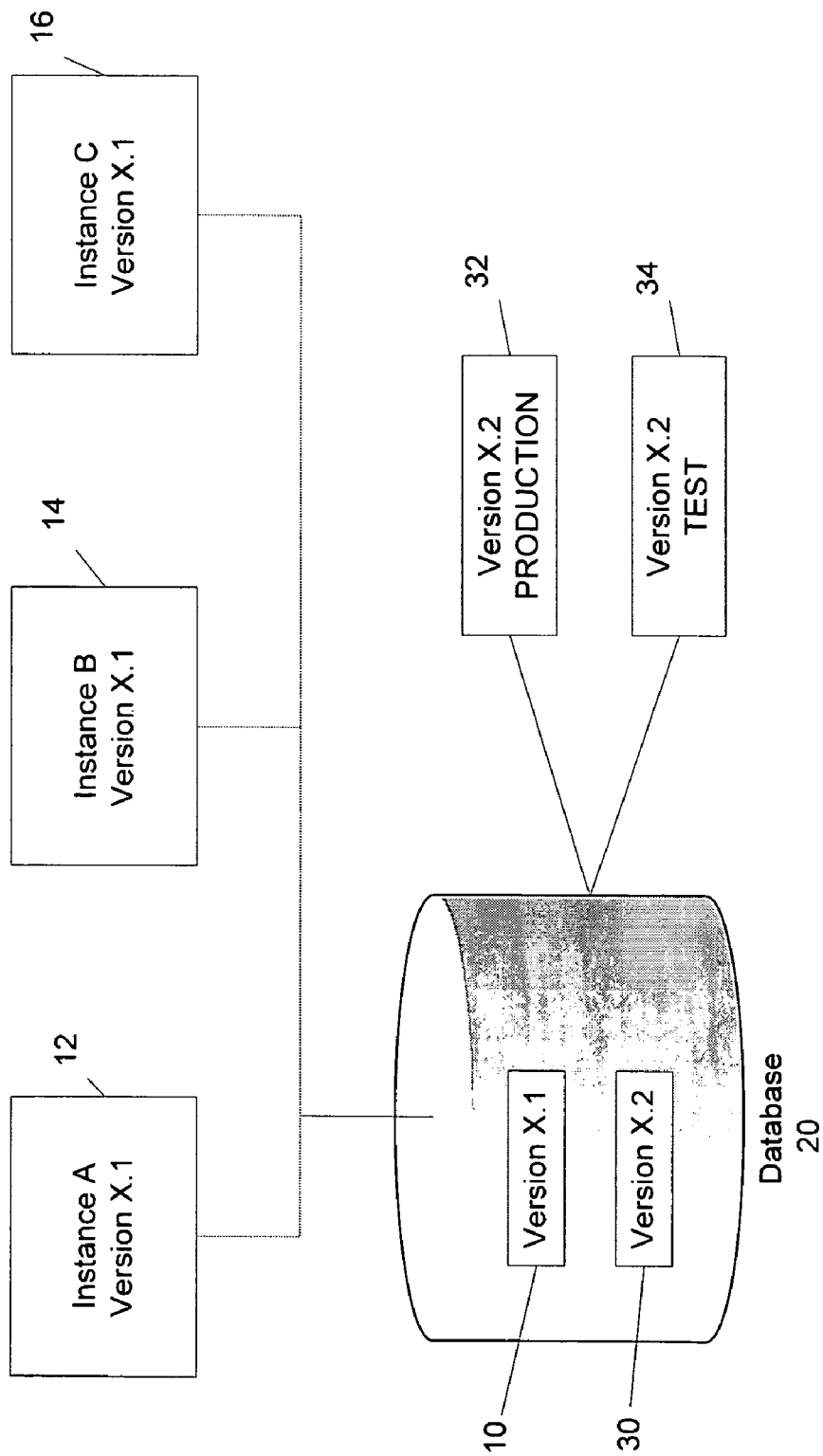
FIG. 1 is a block diagram of a system incorporating features of the disclosed embodiments.

Referring to FIG. 1, a block diagram of one embodiment of a system 100 incorporating features of the disclosed embodiments is illustrated. Although the embodiments disclosed will be described with reference to the embodiments shown in the drawings, it should be understood that the embodiments disclosed can be embodied in many alternate forms of embodiments.

The disclosed embodiments generally relate to allowing different versions of an application to co-exist in the same physical database. This can include for example, both new and old versions, as well as allow for multiple deployments of the same application.

FIG. 1 illustrates one embodiment of a system incorporating aspects of the invention running multiple versions of an underlying application or software from or on the same database application 20. In one embodiment the system 100 generally comprises a database system. As shown in FIG. 1, three instances 12, 14 and 16 of the underlying application 10, version X.1 are running from the database application 20. At some point, an upgrade of version X.1 to version X.2 is desired and carried out. In prior systems, once the underlying application X.1 is upgraded or changed to version X.2, the old schema related to version X.1 would not work anymore, since for example, schema names are hard coded, and the existence of the same schema name related to different versions would cause inherent difficulties and conflicts.

For example, previously, in order to execute an application upgrade from version X.1 to version X.2, the system would track which version of the application was running. The upgrade process would detect which version was running and perform an upgrade accordingly. The system would mark the upgrade to version X.2 as complete and the hard coded schema would now relate to the upgraded version X.2 and not the prior version X.1, since the prior version X.1 will no longer exist. Thus, it would not be possible to relate data or run applications pertaining to the prior version X.1. This can be undesirable where data has not been tested with the new version, and it is desirable to have such an opportunity. However, the aspects of the invention allow for more than one version of the application to simultaneously co-exist and be resident on the same database 20.

In one aspect, the disclosed embodiments relate to the use of schema namespaces to make the schema names 32, 34 for each application 30 version within the same system 20 unique. For example, as illustrated in FIG. 1, instances 12, 14, and 16 continue to run version X.1 of the base application X after an upgrade to version X.2. In one embodiment, the upgrade to version X.2 includes the creation of unique schema namespaces 32, 34 related to Version X.2. The unique schema namespaces allow for separate copies of the application version X.1 and version X.2 running on the database instance 20. Thus, with respect to the example shown in FIG. 1, the upgrade to version X.2 comprises the creation of a portal 32 named "Production", and a portal 34 named "Test". The schema namespace generated for each of these two examples is Production and Test, respectively. In order to allow each instance 32, 34 to operate on the database 20, in conjunction with instances 12-16 operating on version X.1, unique schema names need to be created.

For example, if the underlying application was a "Payroll" application or program, the actual schema name used by the Payroll application in the Production namespace 32, can be defined as Payroll_Production. In the Test namespace 34, the schema name generated can be Payroll_Test. Without the existence of a namespace, the schema name for the Payroll application would always just be "Payroll". This will not allow the two versions, X.1 and X.2 to co-exist because, since for example the instance 12, running data for version X.1 will not know which version, X.1 or X.2, to relate to since the schema name it looks for is "Payroll". However, the use of schema namespaces, to generate unique schema names, enables separate copies of the application (i.e version X.1 and version X.2) to run on the same database instance. This can allow, for example, a production system to run the business using the existing version (e.g. X.1) of an application and a test system to test new features or product versions of the upgraded application (e.g. X.2), each running on the same database system 20. The schema namespace ensures that the schema names are unique, and the different instances of the application (e.g. X.1 and X.2) will not conflict with each other.

Generally, schema names are "hard-coded" because the meaning of an identifier in one namespace is completely separate from the meaning it has in any other namespace. In order to distinguish between versions of applications running on a database, in one embodiment, a schema version registry is created that includes one or more schema namespaces, also referred to herein as metadata repository containers ("MRC"). Information is recorded in the schema registry that can be used to determine the current state of the system and keep track of multiple versions of software co-existing in the same system. In one embodiment, an application programming interface ("API") can be used to permit the software that installs, upgrades, patches and administers applications to record information in the schema version registry as well as query the registry. In one embodiment, a schema name generator can be used to generate the unique schema names, which will be recorded in the schema version registry. The schema name generator can be part of the metadata repository container, or a stand also component or system.

Figure 2:
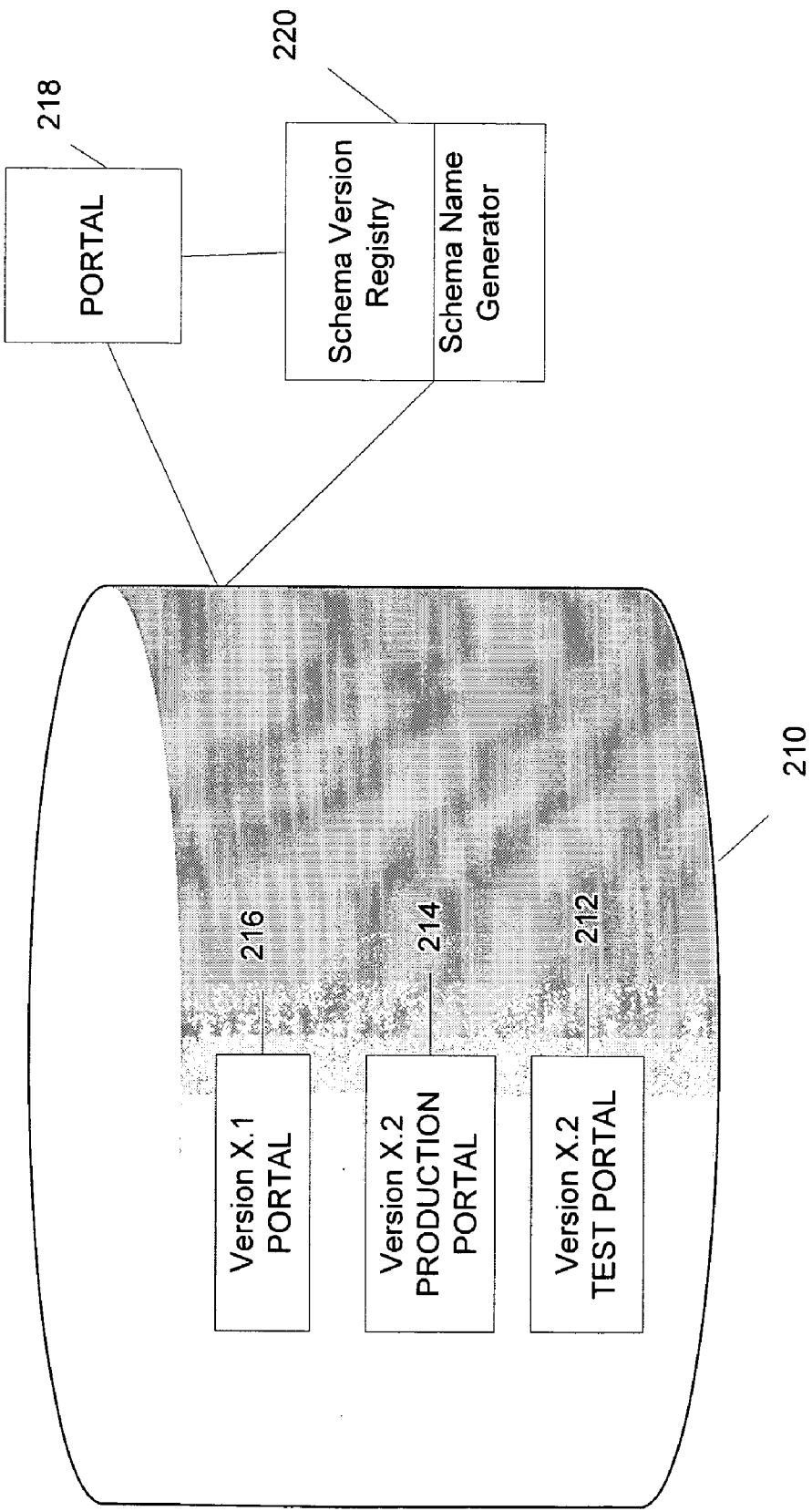
FIG. 2 is a block diagram of another aspect of a system incorporating features of the disclosed embodiments.

The metadata repository container will be used to create a unique schema name for each version of the underlying application. For example, FIG. 2 illustrates a system where a user is running an application named Portal 218 on the system 210, which in this example is represented as a database application. In alternate embodiments, the application can comprise any suitable system or program. Two versions of the Portal application 218 are resident on the system 201, namely version X.1 and version X.2. The component identification is "Portal". In an existing system, where the schema names are hard coded, the system or customer would not be able to differentiate between the different components of different versions, since the respective components would have the same component identification. However, by defining separate systems, such as for example "Production" and "Test", and creating a metadata repository container for each system, the user can run the different versions, X.1 and X.2, of the same component, Portal. Each system is uniquely named, and a metadata repository container is created for each component.

The namespace, or metadata repository container, is used to make the schema names unique. For example, in an application named "Payroll", in the "Production" namespace, the actual schema name used by the "Payroll" application can be defined as "Payroll_Production", whereas in a "Test" namespace, the schema name that can be generated by the schema name generator can be "Payroll_Test". The schema namespace in these two examples is "Production" and "Test", respectively. Without the existence of a namespace, the schema name used by the Payroll application would always be just "Payroll". The use of the schema namespace allows separate copies of the same application to run on the same instance, which for this example is a database instance. The schema namespace ensures that schema names are unique, and the two instances of the "Payroll" application do not conflict with each other.

For example, with reference to FIG. 2, in one embodiment, separate metadata repository containers, or schema namespaces, are created for each of the "Test" system 212, the "Production" system 214, and the original "Portal" application 216. The Portal application 216 is associated with version X.1, while each of the Production 214 and Test 212 systems are associated with version X.2. In one embodiment, unique schema names can be created that are a combination of the system name and the component identifier.

For example, for the embodiment illustrated in FIG. 2, the schema name for the original portal application 216 is "Portal" and for the Test system 212, the namespace is "Test". The schema name for the Test namespace is "Test_Portal", and for the production system 214, the schema name for the Production namespace is "Production_Portal". In alternate embodiments any suitable names or identifiers can be used, so long as each schema name for a namespace is unique. Thus, referring to the system illustrated in FIG. 2, the user can have multiple versions of the same underlying application running on the same database system 210 because the schema name for each namespace, 212, 214 and 216 of the Portal application 218 is unique. In the above example, the Production system 214 and Test system 212 can co-exist on the same database instance 210 because each system is stored in a separate metadata repository container 212, 214, 216 in the same database.

Since multiple metadata repository containers can co-exist in the same physical database, a mechanism is provided to generate unique, physical schema names for each component and a look-up mechanism for each component to determine its MRC specific physical schema name given its "logical" schema name. For example, a "Portal" component may expect to use the "Portal" schema name. However, there can only be one such schema in the database. In order to support multiple metadata repository containers per database, a unique schema name must be generated for each metadata repository container. In one embodiment, this comprises creating a schema name that names the occurrence of the "Portal" component with respect to the metadata repository container in which it resides.

For example, referring again to FIG. 2, the occurrence of the Portal schema that resides in the MRC 212 named Test can be named "Portal_Test" or "Test_Portal". Thus, in this example, the schema name is guaranteed to be unique by appending the MRC name to the logical schema name.

Referring to FIG. 3, in one embodiment, the schema version registry comprises one or more relational tables that identify an application as belonging to a logical group, and provides a mapping of logical to physical schema names. In FIG. 3, the logical schema name is referred to as the component ID. The database applications can be segregated along the lines of the different application versions or systems. In one embodiment, applications such as for example, PAYROLL, BENEFITS, INVENTORY, can be logically grouped into a metadata repository container. The metadata repository container contains all of the schemas needed to uniquely identify and distinguish between applications and the metadata that is stored in the database. The production-system and test system referred to earlier are examples of metadata repository containers. The tables track all the components that belong to that group. Components can include for example the metadata type, the component identifier, and the version information. The database schema names, including generated schema names, the schema versions and status can also be included as shown in FIG. 3. Each time a components metadata schema definitions change in the metadata repository, whether as a result of a fresh install, an upgrade or a patchset installation, the version numbers also change and these metadata versions are stored in system tables where they can be queried later by applications and the database administrator.

If a component uses more than one schema, the schema version registry 220 of FIG. 2, can store the main schema name for each component. Applications can derive secondary schema names from the main schema name. For example, the Portal X.2 component has Production and Test schemas. The schema version registry will store just the names for the PORTAL schema.

For example, referring to FIG. 3, for the component ID "Portal", there are three metadata repository containers created. One for the original version X.1, in the namespace "X". The schema name created is "Portal". For both the Production and Test namespaces created with respect to version X.2, the schema names are "Production_Portal" and "Test Portal", respectively. For the component ID "Discoverer", only one namespace is shown, "Test". Thus, for example, the unique schema name can be "Test_Discoverer". In alternate embodiments, any suitable name combination can be created and used, provided that the schema names remain unique so that the instance of the component ID do not conflict with each other.

Figure 4:
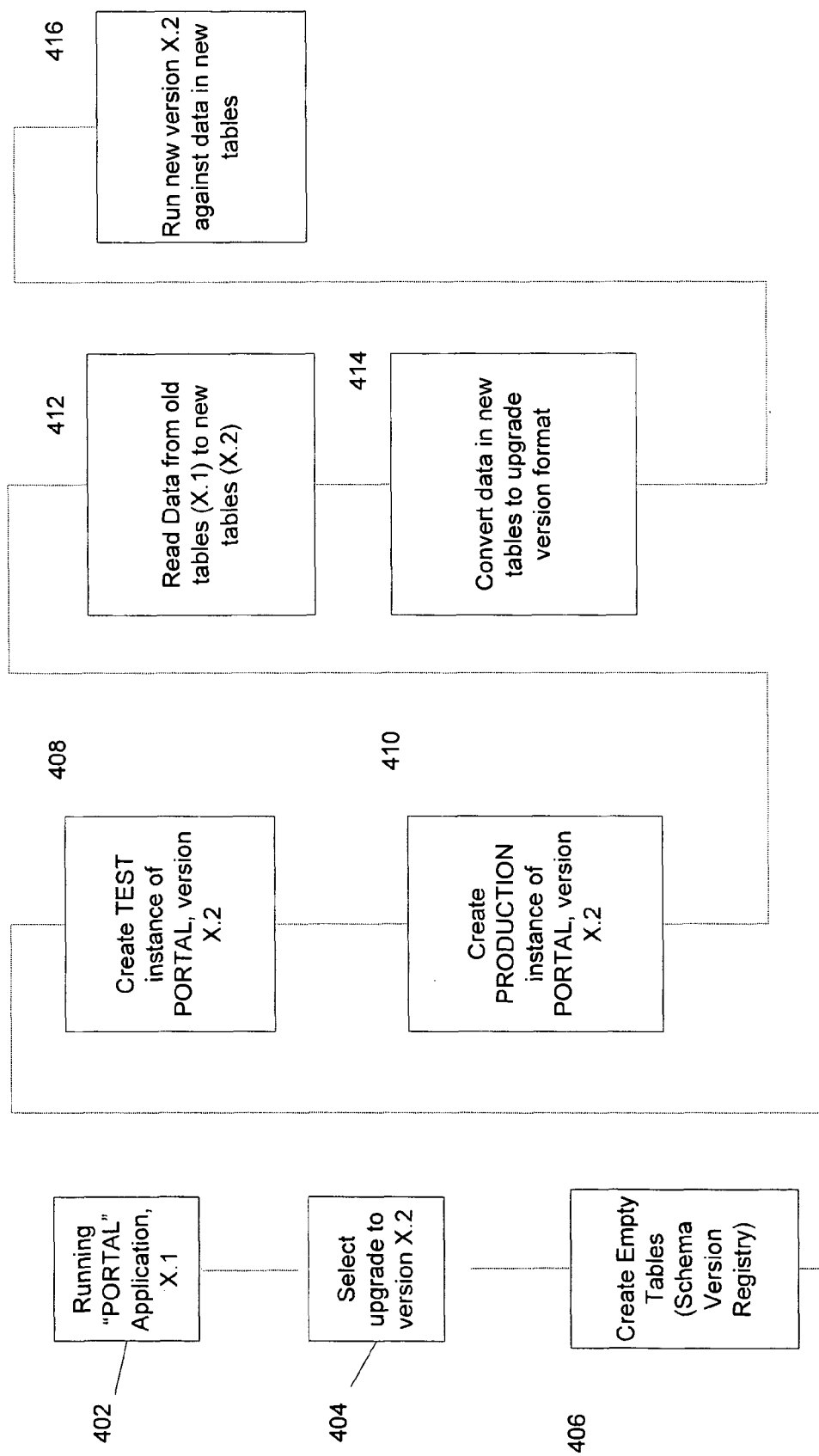
FIG. 4 is a flowchart illustrating one embodiment of a method incorporating features of the disclosed embodiments.

Referring to FIG. 4, in one embodiment, the underlying application the user is running 402 is named Portal, version X.1. A new version, or upgrade to version X.2 is available 404. The user does not wish a destructive upgrade, and prefers to establish a test and production version of the new upgrade X.2. In order to upgrade to version X.2, without destroying the underlying version X.1, a set of empty tables is created 406 to create the schema version registry. The "test" and "production" namespaces are created and added 408, 410 to the schema version registry. A system 500, as shown in FIG. 5, is established.

Figure 5:
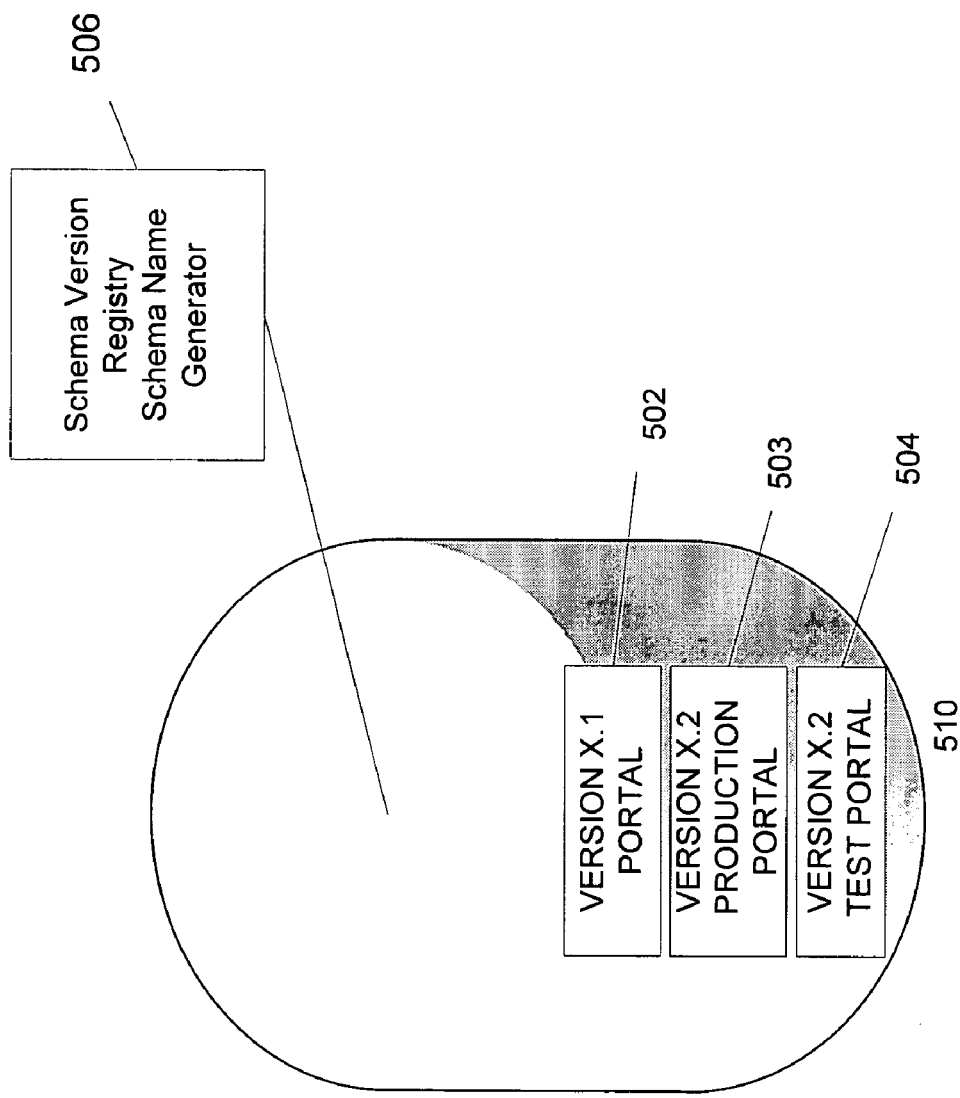
FIG. 5 is a block diagram of another aspect of a system incorporating features of the disclosed embodiments.

As shown in FIG. 5, the metadata repository containers for each of the namespaces, "Portal" 502, "Production" 503 and "Test" 504 are created. The schema version registry 506 creates and records the schema names.

Data from the old tables related to PORTAL version X.1 will be read 412 to the new tables associated with PORTAL version X.2. As the data is read, the data can be converted 4414 to the format of the upgrade version. The source of the old data is the metadata version container 502, for the X.1 version. Since the schema name of the upgrade version is designated as test, the data will be written to tables in this version only. Once the copy operation is complete, the new version X.2 can be run 416 against the actual data copied from the old version X.1 to determine if the new version X.2 works, prior to switching the system over to the new version X.2.

In one embodiment, a set of operations can be implemented in any suitable computer programming language that allow the applications to register themselves, their version and status information. Database views can be used to query the database to determine the current state of the system and track the multiple versions of software co-existing in the same system. In one embodiment, the same system also includes a unique schema name generator that is used by the applications to generate unique schema names for each of the applications. A database management system requires unique schema names. Since, according to the aspects of the invention, there can be more than one instance of the same application in the same database, the schema name generator must be able to create unique schema names for each instance of an application. For example, the schema PAYROLL is non-unique when more than one instance of PAYROLL is running on the database. In order to enable more than one instance of the application "PAYROLL" to run on the same database, unique schema names are created for each instance of the PAYROLL application. For example, metadata repository containers can be created for a "production" system and a "test" system of the PAYROLL application. In order to allow each instance to operate on the database, the schema name generator can create unique names that include for example, PAYROLL_RELEASE1, PAYROLL_PRODUCTION and PAYROLL_TEST schemas.

In one embodiment, the system also includes a mechanism to store version specific information for each schema. When new software, or a new version of software is installed, the information related to the software, version information and state data for example, will be recorded and stored. This information can also be stored in the Schema Version Registry relational database table shown in FIG. 3.

When software is installed or upgraded, from one version to the next, the progress of the installation can also be monitored and recorded. This will allow the system administration to have a record of the current validity of each application as well as information that will identify which version of the application is running. The schema version registry 220 of FIG. 2 provides a "STATUS" indicator. The "STATUS" indicator can be used to represent the progress and final outcome of the component configuration (i.e. installation) or component upgrade. States that can be used to describe the status of the application can include for example, LOADING, LOADED, UPGRADING, UPGRADED, VALID or INVALID. In alternate embodiments, any suitable state identifier can be used. The state identifiers could have meanings as follows:

LOADING: The component creation has begun. Software is in the process of loading.
LOADED: The component creation has been completed and the software has completed loading process. However, the content of the component has not been validated.
UPGRADING: Component upgrade has begun. This state exists as the component is in the process of being upgraded from one version to the next.
UPGRADED: The component has been upgraded to a new version or release, but the content of the component has not yet been validated.
VALID: The content of the upgraded component has been validated and the upgrade or installation is successful. This is the expected terminal state of a component.
INVALID: The component failed the validate component phase and represents a failure during upgrade or installation process. The component remains in an invalid state.

The validation phase is part of a component creation or upgrade. Each component will have a reliable verification script for every schema that it adds or modifies.

Before a client creates a component, the component will be registered as Loading and the component version number is set to become the same as the new release. For example, with reference to FIG. 4, after the empty tables are created and the "test" instance is added to the schema version registry, the status of the upgrade can be indicated as "Loaded". The tables are created, but empty. After all the database objects have been loaded, the client registers the component as Loaded. The verification process now begins. If the verification passes, the component can be marked as Valid. If verification fails, the component is marked as Invalid, and any errors can be logged. For recoverable errors, the DBA may be able to correct the problem and run the client code again. The state can then transition from Invalid to Valid.

A component upgrade will transition through the same states. Before a client updates a component, the client will register the component as Upgrading and set the component version number to be the same as the new release. For example, the component version number will be set as X.2. After all database objects have been upgraded, the client registers the component as Upgraded. If any error exists that would prevent the component upgrade, the component may set its status to Invalid. If verification passes, the component is marked as Valid. If verification fails, the component is marked as Invalid, and any errors can be logged. For recoverable errors, the DBA may be able to correct the problem and run the client code again. The state can then transition from Invalid to Valid. Every component upgrade script should return a success or failure return code.

The aspects of the invention provide a repository creation utility that creates metadata repositories and allows a metadata repository container namespace to be set to the unique name of the running application, such as "Production." The metadata repository container tables are created independently of the databases system, allowing the utility to be a portable implementation.

The aspects of the invention allow multiple versions of software to run in the same database instance concurrently. Upgrades are fully automated because each application registers its version and status information in the centralized schema version registry. This can reduce customer downtime, while the upgrade is in process.

Figure 6:
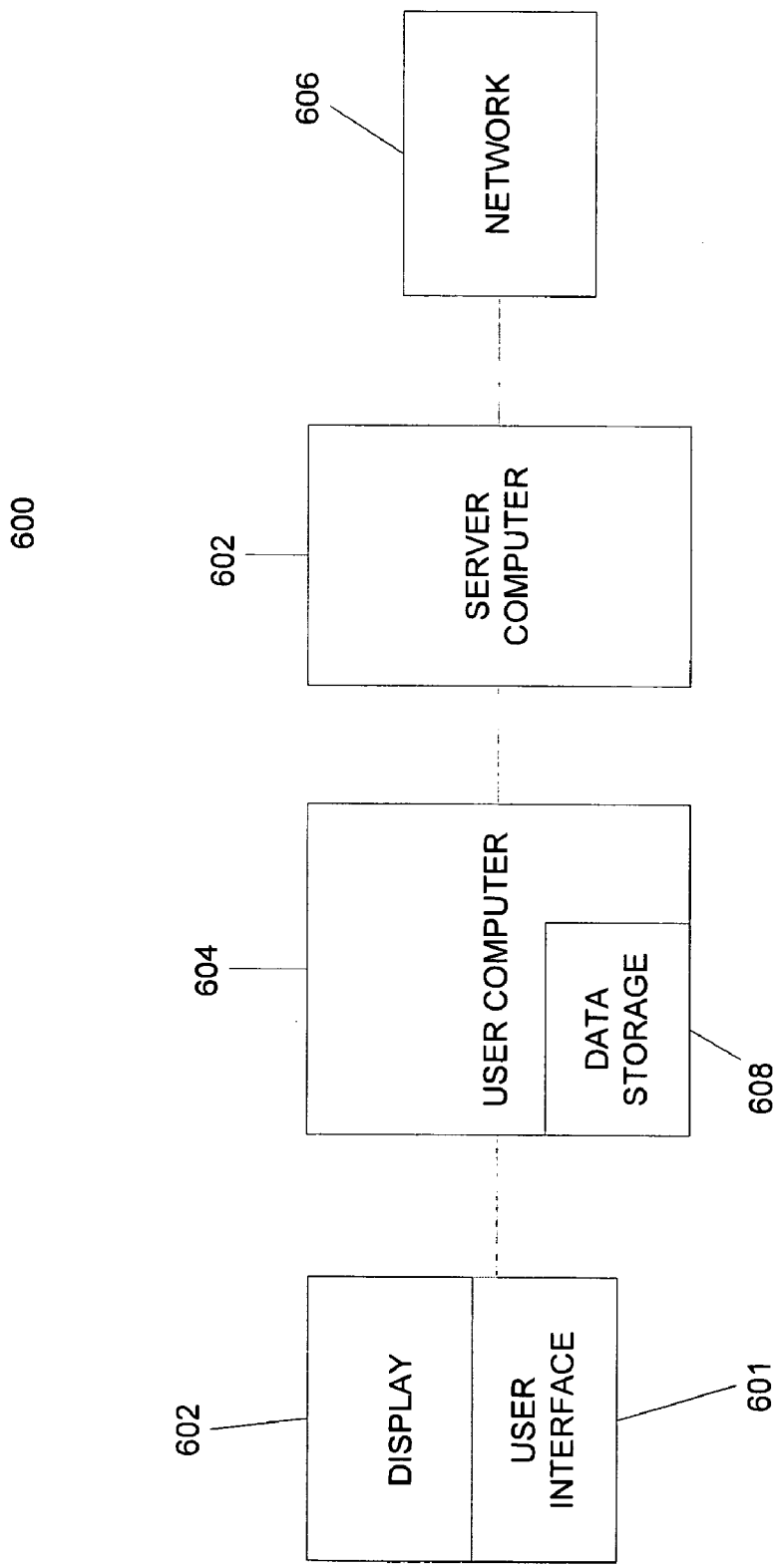
FIG. 6 is block diagram of one embodiment of an architecture that can be used to practice aspects of the disclosed embodiments.

The disclosed embodiments may also include software and computer programs incorporating the process steps and instructions described above that are executed in different computers. FIG. 6 is a block diagram of one embodiment of a typical apparatus 600 incorporating features of the disclosed embodiments that may be used to practice aspects of the invention. For example, in one embodiment, a computer system 604 may be linked to another computer system 602, such that the computers 604 and 603 are capable of sending information to each other and receiving information from each other. As shown in FIG. 6, these computer systems are defined as a User Computer 604 and Server Computer 602. In alternative embodiments, any suitable, and any suitable number of computer systems or structures can be communicatively coupled together to practice the aspects of the invention. In one embodiment, computer systems 604 and 602 could include or be adapted to communicate with a network 604, which in one embodiment may comprise the Internet or any suitable network. Computer systems 604 and 602 can be linked together in any conventional manner including a modem, hard wire connection, or fiber optic link. Generally, information can be made available to both computer systems 604 and 602 using a communication protocol typically sent over a communication channel or through a dial-up connection on ISDN line. Computers 604 and 602 are generally adapted to utilize program storage devices embodying machine readable program source code which is adapted to cause the computers 604 and 602 to perform the method of the disclosed embodiments. The program storage devices incorporating features of the disclosed embodiments may be devised, made and used as a component of a machine utilizing optics, magnetic properties and/or electronics to perform the procedures and methods of the disclosed embodiments. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 604 and 602 may also include a microprocessor for executing stored programs. For example, either or both computers 604 and 602 may include one or more data storage devices 608 as its program storage device for the storage of information and data. The computer program or software incorporating the processes and method steps incorporating features of the disclosed embodiments may be stored in one or more computers 604 and 602 on an otherwise conventional program storage device. In one embodiment, computers 604 and 602 may include or be coupled to at least one user interface 601, and a display interface 602 from which features of the disclosed embodiments can be accessed. In one embodiment, the user interface 601 and the display interface 602 can comprise a single interface device, such as for example a graphical user interface. The user interface 601 and the display interface 602 can be adapted to allow the input of queries and commands to the system, as well as present the results of the commands and queries.

The aspects of the disclosed embodiments permit applications to co-exist in the same physical database, both old and new versions, as well as allow multiple deployments of the same application. There is an automated upgrade from one version of schemas to another version of schemas by providing a centralized mechanism for a plurality of applications to register their version and status information, and allow a master upgrade program to upgrade multiple different applications that otherwise have no interaction with each other.

What is claimed is:

1. A method, carried out by at least a processor, comprising
generating and storing, in a relational database table, a unique schema name for an instance of a first application that belongs to a first logical group where the unique schema name for the instance of the first application is generated by appending a logical schema name to a first meta-data name;
identifying at least one instance of a second application that belongs to a second logical group, where the second application is distinct from the first application;
generating and storing, in the relational database table, a unique schema name for the at least one instance of the second application that belongs to the second logical group where the unique schema name for the at least one instance of the second application is generated by appending the logical schema name to a second meta-data name, and
concurrently executing the instance of the first application and the at least one instance of the second application by controlling access to an application database by translating the logical schema name from the instance of the first application or the at least one instance of the second application into the corresponding unique schema name for the instance of the first application or the at least one instance of the second application using the relational database table.

2. The method of claim 1, where the second application is a different version of the first application, and where appending the first meta data name to the logical schema name includes adding the logical schema name at the beginning or the end of the logical schema name.

3. The method of claim 1, further comprising creating metadata repository containers (MRC) for one or more logical groups where the meta-data name is the name of a corresponding MRC.

4. The method of claim 1, where the second application is a separate deployment of the first application.

5. The method of claim 3, where an MRC for an application includes an application version indicator.

6. The method of claim 1, comprising: registering the unique schema names in a schema version registry.

7. The method of claim 1, where the unique schema names are not hard coded.

8. A non-transitory computer-readable medium that stores executable instructions that when executed by a device, cause the device to perform a method, the method comprising:
identifying a meta-data name for a first application and at least one second application;
defining version names for the first application and the at least one second application, the at least one second application being a different version of the first application and having a different version name;
creating unique schema names for the first application and the at least one second application, where a unique schema name is formed by appending the meta data name to a version name;
storing, in a version registry database, the unique schema name for the first application and information associated with the first application, and unique names for the at least one second application and information associated with the at least one second application; and
concurrently executing the first application and the at least one second application based, at least in part, on the version registry database.

9. The non-transitory computer-readable medium of claim 8, where the information associated with the first application comprises application version information, schema version information, and metadata repository container (MRC) information, and where the meta-data name is a name of a corresponding MRC.

10. The non-transitory computer-readable medium of claim 8, comprising generating namespaces for the first application and the at least one second application, where a namespace for an application is based, at least in part, on the unique schema name for the application and where appending the meta-data name to the version name includes adding the meta-data name to the beginning or the end of the version name.

11. The non-transitory computer-readable medium of claim 10, comprising storing information associated with a namespace in a metadata repository container.

12. The non-transitory computer-readable medium of claim 11, where a name of the metadata repository container comprises a version name.

13. A schema management system, comprising:
  a metadata repository container (MRC) for storing information associated with an instance of an application, where the MRC distinguishes between instances of the application and associated metadata stored in a database, where the schema management system includes a plurality of MRCs; and
  a schema naming device to generate non-hard coded unique schema names for separate instances of the application that use the database and to enable a concurrent execution of a plurality of instances of an application using the database, and where generating the non-hard coded unique schema names includes appending a meta-data name to a logical schema name for separate instances of the application.

14. The system of claim 13, where an MRC includes version information for an instance of an application.

15. The method of claim 6, where the schema version registry is configured to record progress of installation of an instance of an application and provide a state of the installation.

16. The method of claim 6, where the schema version registry is further configured to identify a current validity of an instance of an application, and identify a version that is running.

* * * * *

UNITED STATES PATENT AND TRADEMARK OFFICE
CERTIFICATE OF CORRECTION

| | | |
|---|---|---|
| PATENT NO. | : 7,970,745 B2 | Page 1 of 1 |
| APPLICATION NO. | : 11/471839 | |
| DATED | : June 28, 2011 | |
| INVENTOR(S) | : Norcott | |

It is certified that error appears in the above-identified patent and that said Letters Patent is hereby corrected as shown below:

On the Title Page, 2nd col., under ("Primary Examiner") line 1, delete "Dong Wong" and insert -- Don Wong --, therefor.

In column 1, line 28, delete "know" and insert -- known --, therefor.

In column 3, line 62, delete "X. I" and insert -- X.1 --, therefor.

Signed and Sealed this
Fifteenth Day of November, 2011

David J. Kappos
*Director of the United States Patent and Trademark Office*